United States Patent
Karaki et al.

(10) Patent No.: US 9,455,862 B2
(45) Date of Patent: Sep. 27, 2016

(54) FREQUENCY SYNCHRONIZATION FOR AN OFDM OPTICAL RECEIVER

(71) Applicant: Orange, Paris (FR)

(72) Inventors: Julie Karaki, Mont Liban (LB); Erwan Pincemin, Gommenec'h (FR)

(73) Assignee: ORANGE, Paris (FR)

( * ) Notice: Subject to any disclaimer, the term of this patent is extended or adjusted under 35 U.S.C. 154(b) by 20 days.

(21) Appl. No.: 14/391,969

(22) PCT Filed: Mar. 27, 2013

(86) PCT No.: PCT/FR2013/050660
§ 371 (c)(1),
(2) Date: Oct. 10, 2014

(87) PCT Pub. No.: WO2013/153305
PCT Pub. Date: Oct. 17, 2013

(65) Prior Publication Data
US 2015/0078764 A1 Mar. 19, 2015

(30) Foreign Application Priority Data
Apr. 10, 2012 (FR) .................... 12 53270

(51) Int. Cl.
*H04B 10/06* (2006.01)
*H04L 27/26* (2006.01)
*H04B 10/61* (2013.01)

(52) U.S. Cl.
CPC ......... *H04L 27/2657* (2013.01); *H04B 10/614* (2013.01); *H04B 10/6164* (2013.01);
(Continued)

(58) Field of Classification Search
CPC .................... H04B 10/61; H04B 10/6164
See application file for complete search history.

(56) References Cited

U.S. PATENT DOCUMENTS

| | | | |
|---|---|---|---|
| 2010/0178057 A1* | 7/2010 | Shieh | H04L 25/0224 398/79 |
| 2010/0202574 A1* | 8/2010 | Chen | H04L 27/2647 375/343 |

(Continued)

FOREIGN PATENT DOCUMENTS

| | | |
|---|---|---|
| EP | 0920163 A2 | 6/1999 |
| EP | 2079212 A1 | 7/2009 |
| EP | 2278768 A2 | 1/2011 |

OTHER PUBLICATIONS

French Search Report and Written Opinion dated Jan. 3, 2013 for corresponding French Application No. 1253270, filed Apr. 10, 2012.

(Continued)

*Primary Examiner* — Dzung Tran
(74) *Attorney, Agent, or Firm* — David D. Brush; Westman Champlin & Koehler, P.A.

(57) ABSTRACT

A method is provided for receiving an optical signal including a step of coherently detecting the optical signal, outputting a multicarrier signal received, and a step of processing the received multicarrier signal, which includes a step of estimating a frequency offset affecting the received multicarrier signal relative to a corresponding multicarrier transmitter signal. The estimation step implements two sub-steps including: a sub-step of determining the entire portion of the frequency offset; and a sub-step of determining the fractional portion of the frequency offset. The sub-step of determining the entire portion implements a measurement, in the spectral range, of an offset between the position of at least one specific carrier of the multicarrier transmitter signal and the position of the corresponding specific carrier or carriers in the received multicarrier signal.

8 Claims, 2 Drawing Sheets

(52) U.S. Cl.
CPC ....... *H04L27/2659* (2013.01); *H04L 27/2675* (2013.01); *H04L 27/2697* (2013.01); *H04B 2210/075* (2013.01); *H04L 27/266* (2013.01)

(56) References Cited

U.S. PATENT DOCUMENTS

| | | | | |
|---|---|---|---|---|
| 2011/0176815 A1* | 7/2011 | Frankel | ............. | H04B 10/5053 398/184 |
| 2012/0134398 A1* | 5/2012 | Gamage | ............. | H04L 27/2666 375/224 |

OTHER PUBLICATIONS

International Search Report dated Jun. 26, 2013 for corresponding International Application No. PCT/FR2013/050660, filed Mar. 27, 2013.

Yang, Qi, et al. "Optical OFDM Basics"; "Chapter 2" In: S. Kumar (ed.): "Impact of Nonlinearities on Fiber Optic Communications", Dec. 1, 2011, Springer, XP002699541.

English Translation of the International Written Opinion dated Oct. 10, 2014 for corresponding International Application No. PCT/FR2013/05060, filed Mar. 27, 2013.

F. Buchali et al., "Improved frequency offset correction in coherent optical OFDM systems", ECOC 2008, paper Mo.4. D.4, vol. 1, pp. 105-106, Brussels, 2008.

Jansen et al., "Coherent Optical 25.8-Gb/s OFDM Transmission Over 4160-km SSMF", Journal of Lightwave Technology, vol. 26, No. 1, Jan. 1, 2008.

Schmidl et al., "Robust Frequency and Timing Synchronization for OFDM", IEEE Transactions on Communications, vol. 45, No. 12, Dec. 1997.

* cited by examiner

FREQUENCY SYNCHRONIZATION FOR AN OFDM OPTICAL RECEIVER

1. CROSS-REFERENCE TO RELATED APPLICATIONS

This Application is a Section 371 National Stage Application of International Application No. PCT/FR2013/050660, filed Mar. 27, 2013, the content of which is incorporated herein by reference in its entirety, and published as WO 2013/153305 on Oct. 17, 2013, not in English.

2. FIELD OF THE INVENTION

The field of the invention is that of transmissions implementing a multicarrier modulation. More specifically, the invention pertains to the reception and processing of multicarrier signals that have undergone a frequency offset between sending and reception. The invention finds application especially in optical transmission systems implementing long-haul wavelength division multiplexing (or WDM) using OFDM (orthogonal frequency division multiplexing) modulation with coherent heterodyne detection.

3. PRIOR ART

OFDM is a technique of multicarrier modulation well known in the field of radio transmission. The processing of the multicarrier signal in relation to the implementing of this technique has already been extensively studied.

In particular, it has been observed that OFDM modulation has efficient properties for optical WDM transmission at high bit rates of over 100 Gbps. Such a modulation is indeed intrinsically robust towards chromatic dispersion and the modal dispersal of polarization, enabling very high spectral efficiency to be achieved.

FIG. 1 thus illustrates an optical transmission line implementing OFDM modulation with coherent heterodyne detection.

On the sending side, the OFDM signal is generated by an arbitrary waveform generator (AWG). Such a generator 11 comprises especially two digital-analog conversion modules enabling the transfer to the analog domain of the two components (the in-phase and in-quadrature components) of the OFDM signal generated in the digital domain. In addition, in order to prevent the problem of aliasing at the output of the digital-analog converters of the generator 11, an oversampling is done: this oversampling cancels out the frequencies situated at the edges of the OFDM band in modulating certain sub-carriers by a zero value. The shaped OFDM signal is generated in the time domain through an inverse fast Fourier transform (IFFT) and then divided into a real part (I) and an imaginary part (Q). Through the two digital-analog converters of the generator 11, the two components I and Q of the OFDM signal are converted into continuous signals.

After filtering by a low-pass filter (LPF 121 and 122), the two components I and Q of the OFDM signal are optically combined by means of an IQ modulator on an optical carrier, i.e. the external cavity laser (ECL) 13. This external cavity laser is formed by two Mach-Zehnder type modulators (MZN 141 and 142), parallel-mounted in a Mach-Zehnder superstructure, the phase difference of which is 90°. This requires the setting of three bias voltages (Vbias): the first voltage is used to adjust the 90° phase difference between the two arms of the previously defined superstructure and the two other voltages are used to set the two Mach-Zehnder modulators on their zero transmission point. Classically, the accurate setting of the bias voltages Vbias on the two Mach-Zehnder modulators is achieved by observation of the spectrum of the OFDM signal on an optical spectrum analyzer with very high resolution (20 MHz) and is done by eliminating the optical carrier from the OFDM band.

Unfortunately, it is not always possible to set the Mach-Zehnder modulators at the zero transmission point so that a residue of optical carrier remains in the middle of the OFDM band or else can be produced by a small variation of the bias voltages Vbias of the Mach-Zehnder modulators (enabling the IQ modulator to be slightly moved away from its optimal operating point) without in any way inducing a deterioration in the performance of the system.

According to one variant, it is possible to generate a specific radiofrequency component at the OFDM transmitter, also called an RF pilot (the OFDM sub-carriers located at the position of the RF pilot being cancelled) which serves essentially to compensate for the phase noise of the lasers directly and efficiently. In practice, this RF pilot is generated by the addition of a direct component or DC offset to the in-phase component I and in-quadrature component Q before entering the two Mach-Zehnder modulators.

The optical signal then undergoes a wavelength multiplexing 15 implementing on a first arm:
  a symbol time offset 151,
  a first polarizer 152;
and on a second arm:
  an variable optical attenuator (VOA) 153;
  an optical delay line (ODL) 154;
  a second polarizer 155;
and a polarization beam combiner (PBC) 156.

The signal sent is therefore a polarization-multiplexed OFDM signal.

On the reception side, a coherent heterodyne detection is implemented.

More specifically, the optical signal undergoes a wavelength demultiplexing 16 implementing a polarization beam splitter (PBS) 161 and a local oscillator 162 having the same wavelength as the laser at the sending side but independent of this laser, thus enabling the detection of the OFDM signal.

The four components of the polarization-multiplexed signal obtained at output of the polarization beam splitter 161 and of the coupling with the local oscillator 162 are filtered and converted into analog signals through an ultra-fast sampling oscilloscope (digital phosphor oscilloscope DPO) and through adjustment of the bandwidth of the four analog-digital converters of the oscilloscope.

The digital signal obtained at output of the DPO is then synchronized 17 and the frequency offset of the signal after synchronization is estimated and compensated for 18 in a carrier frequency offset compensation (CFO) module. This frequency offset between the laser at the sending side, or sending laser, and the laser at the detection side results from the use of a coherent (and non-direct) detection. Indeed, heterodyne coherent detection (which, it may be recalled, is well suited to long-haul WDM transmission) relies on the fact that the signal sent is detected by a local oscillator that is different from the sending laser but has almost the same frequency as that of the sending laser.

The estimation of the frequency offset is a vital step to be performed. Indeed, an error in the estimation of this offset can result in inter-carrier interference or else in a complete deterioration of the performance of the system.

Now, it is difficult to determine and then compensate for this frequency offset between the multicarrier signal received and the local oscillator in optical systems implementing OFDM modulation with coherent detection because of the high values that this offset can take. These values can be far greater than the inter-carrier spacing of the multicarrier signal.

Several solutions have been proposed in the prior art to estimate this frequency offset presented here below.

To this end, we consider a sender multicarrier signal x(t), such that:

$$x(t) = \sum_{k=1}^{N_{Sc}} c_k e^{j2\pi f_k t},$$

with:
$N_{Sc}$ the number of carriers of the sender multicarrier signal;
$c_k$ the constellation symbol carried by the carrier $f_k$.

The multicarrier signal received y(t), affected during transmission by a frequency offset, can be expressed as follows:

$$y(t) = e^{j2\pi \Delta_{CFO} \cdot t} \sum_{k=1}^{N_{Sc}} c_k e^{j2\pi f_k t}$$

with:
$\Delta_{CFO}$ being the frequency offset to be estimated.

The corresponding digital time representation can be expressed in the following form:

$$y_p = e^{j2\pi \Delta_{CFO} \cdot \frac{p \cdot T_s}{N_{Sc}}} \sum_{k=1}^{N_{Sc}} c_k e^{j2\pi f_k \cdot \frac{p \cdot T_s}{N_{Sc}}},$$

with:
p being the index of a temporal sample of the multicarrier signal received;
$T_S$ being the time of an OFDM symbol.

In denoting $$\epsilon = \Delta_{CFO} \times T_s \, et \, \Delta_{CFO} \times \frac{T_s}{N_{Sc}}$$

as the relative frequency offset, we can also write:

$$y_p = e^{j2\pi \cdot \frac{p \cdot \epsilon}{N_{Sc}}} \sum_{k=1}^{N_{Sc}} c_k e^{j2\pi f_k \cdot \frac{p \cdot T_s}{N_{Sc}}}.$$

According to a first solution proposed in the prior art, the estimation of the frequency offset is based on the comparison of OFDM symbols that carry the same information when sent.

Thus, received signals corresponding to the sending of two identical OFDM symbols denoted $x_{1p}$ and $x_{2p}$, are compared:

$$y_p = e^{j2\pi \cdot \frac{p \cdot \epsilon}{N_{Sc}}} \sum_{k=1}^{N_{Sc}} c_k e^{j2\pi f_k \cdot \frac{p \cdot T_s}{N_{Sc}}}$$

$$= e^{j2\pi \cdot \frac{p \cdot \epsilon}{N_{Sc}}} \times x_{1p}$$

$$y_{p+K} = e^{j2\pi \cdot \frac{(p+K) \cdot \epsilon}{N_{Sc}}} \sum_{k=1}^{N_{Sc}} c_k e^{j2\pi f_k \cdot \frac{p \cdot T_s}{N_{Sc}}}$$

$$= e^{j2\pi \cdot \frac{(p+K) \cdot \epsilon}{N_{Sc}}} \times x_{2p}$$

$$= e^{j2\pi \cdot \frac{(p+K) \cdot \epsilon}{N_{Sc}}} \times x_{1p}$$

with:
K being the number of samples in the symbols to be compared; and
p being the index of the sample Thus, we can write:

$$y_p^* y_{p+K} = |x_{1p}|^2 \times e^{j2\pi \cdot \frac{K \cdot \epsilon}{N_{Sc}}}$$

and we can deduce $\epsilon$:

$$\epsilon = \frac{1}{2\pi} \cdot \frac{N_{Sc}}{K} \arg\left( \sum_{p=1}^{p=K} y_p^* y_{p+K} \right). \quad \text{equation (1)}$$

In this case $$\epsilon = \frac{1}{2\pi} \arg\left( \sum_{p=1}^{p=K} y_p^* y_{p+K} \right) \text{ as } K = N_{Sc} \text{ and}$$

$$-\pi \leq \arg\left( \sum_{p=1}^{p=K} y_p^* y_{p+K} \right) \leq \pi.$$

The acquisition range of E is therefore limited to ±0.5, which is not always sufficient to accurately estimate the frequency offset, especially in the context of long-haul WDM transmission.

Starting from the observation that, according to the equation (1), when the number of samples K is divided by 2, the acquisition range is multiplied by 2, another technique has been proposed by F. Buchali et al. in the document "*Improved frequency offset correction in coherent optical OFDM systems*", ECOC 2008, paper Mo.4.D.4, Vol. 1, pp. 105-106, Brussels, 2008. This technique relies on the idea of dividing an OFDM symbol into K sub-symbols all carrying the same information and thus multiplying the acquisition range by K.

More specifically, F. Buchali chose, in a first stage, to divide an OFDM symbol into sub-symbols in order to coarsely estimate the frequency offset according to the method described here above and then, in a second stage, to refine the estimation of the frequency offset by a method of RF pilot filtration and a dedicated signal processing. This dedicated signal processing consists, after extraction of the RF pilot by a filter, in determining the phase of the RF pilot according to the equation $\phi = 2\pi \Delta_{CFO} t + \Delta\phi$ (with $\Delta\phi$ being the phase noise) in order to be able to compensate, at one stroke, for the residue of the frequency offset and the phase noise affecting the payload signal.

It can be noted however that, according to this technique, the frequency offset cannot be de-correlated from the phase noise. The coarse correction of the frequency offset should therefore bring the RF pilot into the frequency acquisition range of the selection filter of the RF pilot. Since this selection filter has a fixed width of a few Δf (3 or 40Δf), the coarse estimation of the frequency offset must be precise to within 3 or 4 Δf.

This technique therefore suffers from many drawbacks, including especially:
- the addition of a dedicated OFDM symbol which wastes payload bitrate;
- the extinguishing of the sub-carriers contained in the filter for selecting the RF pilot, namely four or five payload sub-carriers, which once again leads to a waste in payload bitrate;
- the algorithms for coarsely estimating the frequency offset, based on the sub-division of an OFDM symbol into several sub-symbols, which are complex to implement and therefore costly in terms of computation power.

Other techniques have also been proposed, adapted solely to determining small values of frequency offset (below 5Δf). Besides, in WDM transmission systems, the phase noise introduced by the lasers (sending laser and local oscillator) and by the transmission line (noise related to the amplified spontaneous emission ("ASE") and non-linear effects) is substantial and can prevent these techniques from working whatever the value of the frequency offset.

There is therefore need for a novel technique of frequency offset estimation that performs well whatever the value of the frequency offset.

4. SUMMARY OF THE INVENTION

The invention proposes a novel solution that does not have the drawbacks of the prior art in the form of a method for receiving an optical signal comprising a step of coherent detection of the optical signal delivering a received multicarrier signal, and a step for processing said received multicarrier signal comprising a step for estimating a frequency offset affecting the received multicarrier signal relative to a corresponding sender multicarrier signal, or multicarrier signal at the sending side, said offset being strictly greater than the inter-carrier spacing of the sender multicarrier signal.

According to the invention, the step for estimating implements two sub-steps comprising:
- a sub-step for determining the integer part of the frequency offset equal to a multiple of the inter-carrier spacing;
- a sub-step for determining the fractional part of the frequency offset, equal to a fraction of the inter-carrier spacing;

the sub-step for determining the integer part of the frequency offset implementing a measurement, in the spectral domain, of an offset between the position of at least one specific carrier of the sender multicarrier signal and the position of the corresponding specific carrier or carriers in the received multicarrier signal.

The invention thus proposes a novel solution for estimating the frequency offset enabling a precise estimation of this offset whatever its value, and especially when it is very great relative to the inter-carrier space Δf of the multicarrier signal (beyond 1 GHz for example).

In particular, the proposed technique is simple to implement and costs little in terms of computation power.

In considering that the frequency offset $\Delta_{CFO}$ can be sub-divided into a fractional part α equal to a fraction of the spacing Δf between two sub-carriers (α<1), and an integer part n (n is a positive or negative integer, n>1, that can be beyond 1 GHz), the proposed technique relies on a processing in two passes delivering, in one pass, the integer part n of the frequency offset and, in the other pass, the fractional part α of the frequency offset. These two passes can be implemented simultaneously or successively in any order whatsoever.

In particular, the specific carriers belong to the group comprising:
- a pilot carrier, the position of which, in the sender multicarrier signal, is known to at least one receiver implementing the method of processing;
- a residual carrier, the frequency of which corresponds to a sending frequency of a signal after combination of the in-phase and in-quadrature components of the sender multicarrier signal;
- a payload carrier comprising the first or the last sub-carrier carrying payload data in the sender multicarrier signal.

These specific carriers are thus easily to identify in the received signal, in the spectral domain, and it is possible to simply measure the offset between the position of the specific carrier or carriers in the sender multicarrier signal and the position of the corresponding specific carrier or carriers in the received signal.

For example, if we look at the context of an optical transmission, according to a first embodiment, the specific carrier can be the RF pilot as presented with reference to the prior art. According to a second embodiment, the specific carrier can be a residual optical carrier, the frequency of which corresponds to a frequency at which an optical signal is sent, after combination of the in-phase and in-quadrature components of the sender multicarrier signal. According to a third embodiment, the specific carrier is the first or last sub-carrier carrying payload data in the sender multicarrier signal.

Naturally, these different embodiments can be combined.

According to a first example of an embodiment, the method for receiving comprises a step for detecting, in the received multicarrier signal in the spectral domain, at least one power peak above a predetermined threshold, delivering the position of the specific carrier in the received multicarrier signal.

According to a second example of an embodiment, the method for receiving comprises a step for detecting, in the received multicarrier signal in the spectral domain, a difference in power between two successive carriers that is above a predetermined threshold, delivering the position of the specific carrier in the received multicarrier signal.

The position of the specific carrier in the received multicarrier signal is thus easily and speedily obtained by using the classic operations of signal processing.

According to another characteristic of the invention, the sub-step for determining the fractional part of the frequency offset makes a comparison between at least two multicarrier symbols of the received multicarrier signal corresponding to multicarrier symbols that are identical when sent.

The fractional part of the frequency offset can thus be determined classically, as presented with reference to the prior art.

The invention, in at least one embodiment, thus proposes to estimate the frequency offset affecting the received multicarrier signal by combining a classic technique for determining the fractional part of the frequency offset and an original technique for determining the integer part of the frequency offset.

In particular, the method for receiving according to the invention comprises a step for compensating for the frequency offset implementing a summing of the integer part and the fractional part, a conversion of the result of the summing from the spectral domain into the time domain, and a multiplication of said received multicarrier signal by the result of the conversion of in the time domain.

The invention thus makes it possible to compensate for the frequency offset affecting the multicarrier signal received whatever the value of this offset and especially if this value is great relative to the spacing between two carriers of the sender multicarrier signal.

Naturally, the different characteristics of this processing method can be combined.

The proposed technique is especially well suited to estimating and compensating for the frequency offset affecting a multicarrier signal in a long-haul WDM optical transmission system using OFDM modulation with coherent heterodyne detection.

Another aspect of the invention pertains to a computer program comprising instructions for implementing a method for processing and/or a method for receiving as described here above when this program or these programs are executed by a processor.

The methods of processing and reception according to the invention can therefore be implemented in various ways, especially in software form or even in hardware form, in an ASIC (applications-specific integrated circuit) for example.

In another embodiment, the invention pertains to a device for receiving an optical signal comprising means of coherent detection of said optical signal, delivering a received multicarrier signal, and means for processing said received multicarrier signal comprising means for estimating a frequency offset affecting the received multicarrier signal relative to a corresponding sender multicarrier signal, said offset being strictly greater than the inter-carrier spacing of the sender multicarrier signal.

According to the invention, the means for estimating comprise:
means for determining the integer part of the frequency offset equal to a multiple of the inter-carrier spacing;
means for determining the fractional part of the frequency offset equal to a fraction of the inter-carrier spacing;
and means for determining the integer part of the frequency offset comprise means for measuring, in the spectral domain, an offset between the position of at least one specific carrier of the sender multicarrier signal and the position of the corresponding specific carrier or carriers in the received multicarrier signal.

Such a device for receiving is especially suited to implementing the method of reception described here above. It is for example a module for estimating the carrier frequency offset compensation (CFO) of a reception system. It can also be integrated into a receiver capable especially of receiving an optical signal.

This device could of course comprise the different characteristics of the method of processing according to the invention which can be combined or taken in isolation. Thus, the characteristics and advantages of this device are the same as those of the method of processing described here above. They are therefore not described in more ample detail.

In particular, the processing of the received signal can be done offline or in real time, using software or hardware means.

The proposed technique is thus easy to implement and does not call for the use of additional components for its implementation. As already indicated, it makes it possible to compensate for frequency offsets of high amplitude, especially of the order of 1 GHz.

5. LIST OF FIGURES

Other features and advantages of the invention shall appear more clearly from the following description of a particular embodiment, given by way of a simple, illustratory and non-exhaustive example and from the appended drawings, of which:

FIG. 1, presented with reference to the prior art, illustrates an example of a sequence of transmission of an optical signal implementing a technique of coherent detection in reception;

FIG. 2 describes the main steps implemented by the method of processing according to the invention;

Figure 5:
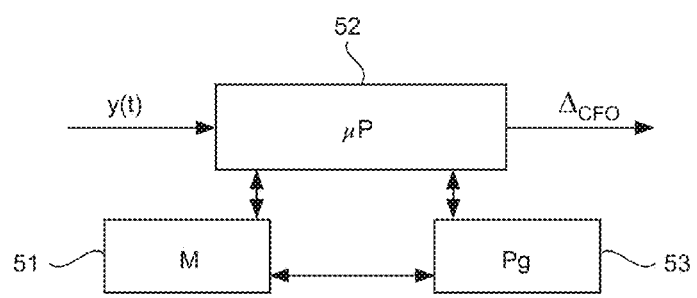

FIG. 5 presents the structure of a processing device implementing a technique for processing the received multicarrier signal according to one particular embodiment of the invention.

6. DESCRIPTION OF ONE EMBODIMENT OF THE INVENTION

The general principle of the invention relies on the estimation in two passes of the frequency offset affecting a received multicarrier signal, one of the passes enabling the integer part of this frequency offset to be determined in a wholly novel manner and the other pass enabling the fractional part of this frequency offset to be determined conventionally.

The technique proposed can be applied to any system of transmission implementing a multicarrier modulation of an OFDM or BFDM (Bi-Orthogonal Frequency-Division Multiplexing) or advanced OFDM type for example, for which a frequency offset $\Delta_{CFO}$, greater than the space between two carriers of the sender multicarrier signal, affects the received multicarrier signal in relation to the corresponding sender multicarrier signal.

In particular, the proposed technique uses the classic carriers of a multicarrier signal and does not require the insertion of a guard interval in the sender multicarrier signal, thus optimizing the spectral efficiency of the signal sent.

The invention can be applied especially in long-haul WDM optical transmissions using OFDM modulation with coherent heterodyne detection. However, the invention is not limited to optical transmission and can also be applied in radiofrequency transmission.

Here below, with reference to FIG. 2, we present the main steps implemented by the method for receiving a received multicarrier signal according to the invention.

Such a method for receiving comprises a step 21 for estimating a frequency offset $\Delta_{CFO}$ affecting the received multicarrier signal relative to a corresponding sender multicarrier signal, or multicarrier signal at the sending side, such that $\Delta_{CFO} > \Delta f$, with $\Delta f$ being the inter-carrier spacing of the sender multicarrier signal.

Figure 2:
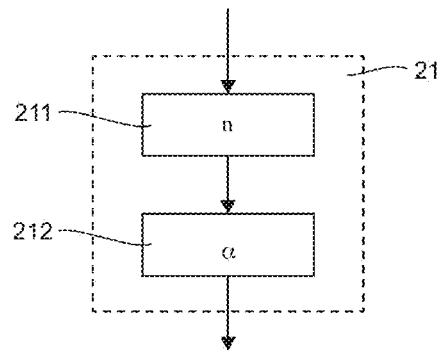

As illustrated in FIG. 2, the step of estimation 21 implements two sub-steps comprising:
a sub-step 211 for determining the integer part n of the frequency offset, equal to a multiple of the inter-carrier spacing;

a sub-step 212 for determining the fractional part α of the frequency offset equal to a fraction of the inter-carrier spacing.

We therefore have $\Delta_{CFO}=(\alpha+n)$, or again $$\Delta_{CFO} \times \frac{T_s}{N_{Sc}} = (\alpha+n) \times \Delta f$$

as the relative frequency offset, with $T_S$ being the time of a symbol of the sender multicarrier signal and $N_{Sc}$ being the number of carriers of the sender multicarrier signal.

For example, the sub-step 212 for determining the fractional part α of the frequency offset $\Delta_{CFO}$, performed before or after the sub-step 211 for determining the integer part of the frequency offset, makes a comparison of at least two multicarrier symbols of the received multicarrier signal, corresponding to identical multicarrier symbols when sent, according to the technique described with reference to the prior art. Other known techniques for determining the fractional part α of the frequency offset $\Delta_{CFO}$, can also be implemented.

The sub-step 211 for determining the integer part n of the frequency offset carries out, for its part, a measurement in the spectral domain of an offset between the position of at least one specific carrier of the sender multicarrier signal and the position of the corresponding specific carrier or carriers in the received multicarrier signal.

For example, a specific carrier of this kind belongs to the group comprising:
 a pilot carrier, the position of which in the sender multicarrier signal is known to at least one receiver implementing the method for receiving;
 a residual carrier, the frequency of which corresponds to a frequency at which a signal is sent after combination of the in-phase and in-quadrature components of the sender multicarrier signal;
 a payload carrier comprising the first or last sub-carrier carrying payload data in the sender multicarrier signal (band-edge carrier).

Figure 3:
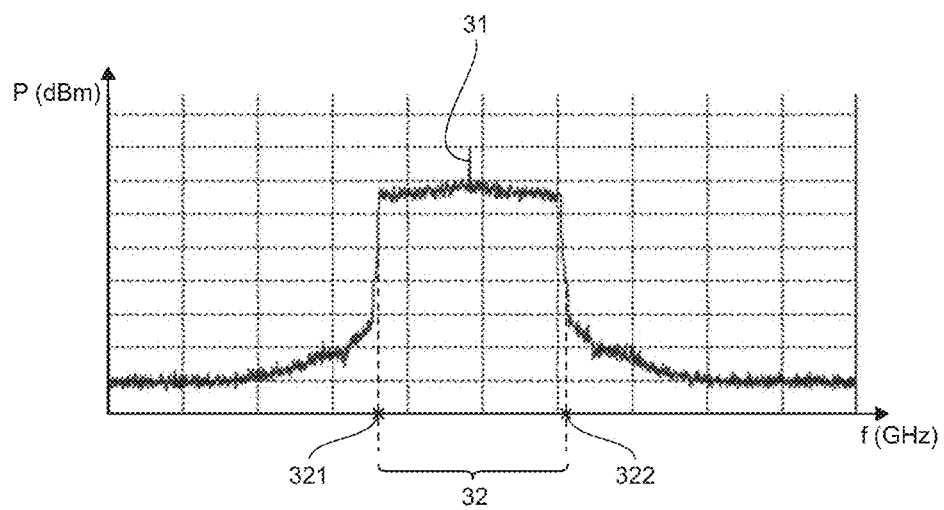
FIG. 3 illustrates the spectrum of an OFDM signal at output of an electro-optical IQ modulator.

The description here below is situated, by way of an illustratory and non-exhaustive example, in the field of optical transmissions according to the transmission scheme of FIG. 1, and considers a sender multicarrier signal as illustrated in FIG. 3. More specifically, FIG. 3 represents the spectrum of an OFDM signal at output of a IQ modulator (power of the OFDM signal in dBm as a function of the frequency in GHz).

This FIG. 3 shows that the OFDM signal has particular features. For example, the residue of the optical carrier has power greater than that of the other OFDM carriers. The residue of the optical carrier 31 is therefore visible in the middle of the spectrum of the OFDM signal. Similarly, the payload carriers 32 have power greater than that of the carriers modulated by a zero value. The payload carriers 32 can therefore be distinguished from the zero value carriers.

It is thus possible to identify specific carriers corresponding for example to the optical residual carrier 31, to the first carrier 321 carrying payload data in the OFDM signal, to the last carrier 322 carrying payload data in the OFDM signal, or again to a pilot carrier (not illustrated in FIG. 3), and to determine the indices of these carriers.

For example, the optical residual carrier 31, appearing in the middle of the spectrum of the OFDM signal when it is sent, is considered to bear the index 0.

Figure 1:
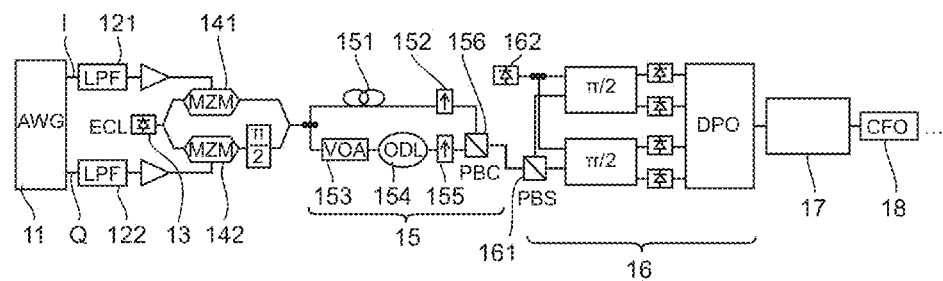

According to this illustratory and non-exhaustive example, the method for receiving according to the invention is also deemed to be implemented in the CFO module 18 illustrated in FIG. 1. The received multicarrier signal corresponds therefore to the signal obtained after the steps of coherent detection 16 and synchronization 17 illustrated in FIG. 1.

According to the invention, in order to estimate the integer part of the frequency offset $\Delta_{CFO}$ affecting the received multicarrier signal relative to a corresponding sender multicarrier signal, a measurement is made in the spectral domain of an offset between the position of at least one specific carrier of the sender multicarrier signal and the position of the corresponding specific carrier or carriers in the received multicarrier signal.

Figure 4:
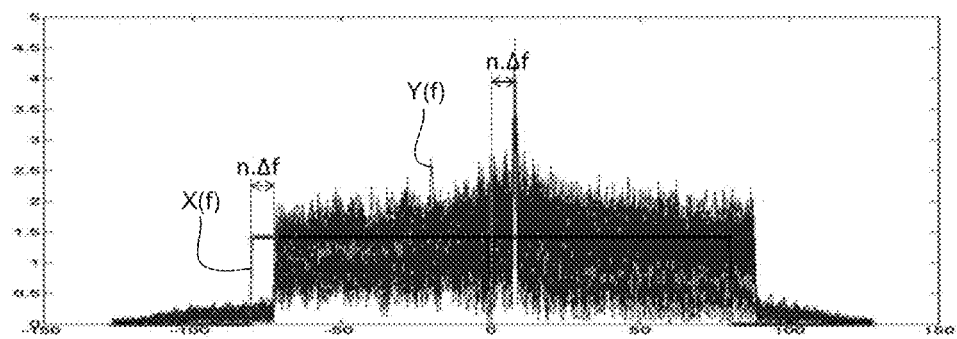
FIG. 4 illustrates the superimposition of the spectra of the OFDM signal at the sending side and at the receiving side.

To this end, the spectra of the sender multicarrier signal, denoted as X(f), and of the received multicarrier signal, denoted as Y(f), are compared in baseband as illustrated in FIG. 4.

According to a first example illustrated in FIG. 4, the offset between the position of the optical residual carrier 31 of the OFDM signal and the position of the corresponding carrier in the received multicarrier signal is measured. It is noted that, after homodyne detection (where a same laser is used in sending and at reception), the optical carrier is situated on the first carrier in baseband of the OFDM signal. By contrast, after heterodyne detection, the residue of the optical carrier is identified on another frequency that has to be identified. It can also be recalled that the determining of the integer part of the frequency offset n is done in the frequency or spectral domain after the Fourier transform. The spectral power density of the received multicarrier signal is then observed. As can be seen in FIG. 4, a power peak corresponding to the residue of the optical carrier appears at the frequency indexed n. In baseband and after correction of the fractional part, the difference between the first sub-carrier indexed 0, corresponding to the position of the residual optical carrier in the sender multicarrier signal, and the sub-carrier indexed n, localized at the position of the residual optical carrier in the received multicarrier signal, gives the integer part of the frequency offset n.

In other words, this first example looks at the way in which the center of the spectrum of the sender multicarrier signal has shifted.

According to a second example, also illustrated in FIG. 4, the offset between the position of the first sub-carrier 321 (or last sub-carrier respectively) carrying payload data in the OFDM signal and the position of the corresponding carrier in the received multicarrier signal is measured. It is sought in this example to retrieve the spectral position of the first (or respectively the last) payload carrier (i.e. non-zero carrier) located just after (or respectively before) the sub-carriers set at zero. The comparison of the index of this first (or respectively last) sub-carrier, which still carries information, with the corresponding index in the sender signal, gives the frequency part of the offset signal n.

In other words, this second example looks at the way in which an edge of the spectrum of the sender multicarrier signal has shifted In a third example, not shown, the offset is measured between the position of a pilot carrier and the position of the corresponding carrier in the received multicarrier signal. This spectral location of the frequency offset of the pilot carrier in this third example is achieved in the same way as in the first example.

In other words, this third example looks at the way in which a pilot of the sender multicarrier signal has shifted.

As already indicated, these three embodiments can be implemented in isolation or can possibly be combined to improve the performance characteristics of the system.

In particular, in order to determine the position of the specific carrier or carriers in the received multicarrier signal, different techniques can be implemented.

According to a first technique, the position of the specific carrier or carriers is determined by detecting, in the multicarrier signal received in the spectral domain, at least one power peak above a predetermined threshold.

Indeed, the pilot carriers or the optical residual carrier generally have a level of power greater than that of the other payload carriers. The carriers of the received multicarrier signal associated with a power peak can therefore be considered to be specific carriers.

According to a second technique, the position of the specific carrier or carriers is determined by detecting a power difference between two successive carriers, in the multicarrier signal received in the spectral domain, that is above a predetermined threshold.

Indeed, since the payload carriers have a power level greater than that of the zero carriers, and since the pilot carriers or the optical residual carrier have a power level greater than that of the payload carriers, there is a power difference between the zero carriers and the carrier bearing payload data or between the carriers bearing payload data and the pilot carriers or again between pilots carrying payload data and the residual optical carrier.

It is thus possible to detect a specific carrier when it has a power difference with a neighboring carrier above a predetermined threshold.

Naturally, other techniques can also be envisaged to determine the position of the specific carriers in the received multicarrier signal.

At the end of these steps, the integer part n of the frequency offset $\Delta_{CFO}$ is thus obtained.

Once the integer part of the frequency offset $\Delta_{CFO}$ is determined, the received multicarrier signal is corrected in the time domain by multiplying the received multicarrier signal by the expression $$e^{-j2\pi \cdot \frac{p \cdot \epsilon}{N_{Sc}}}, \text{ with } \epsilon = \Delta_{CFO} \times T_s = (\alpha + n) \times T_s.$$

In other words, according to one example of an implementation, the method for receiving according to the invention comprises a step of frequency offset compensation implementing a summing of the integer part and the fractional part, a conversion of the result of the summing from the spectral domain to the time domain, and a multiplication of said received multicarrier signal by the result of the conversion in the time domain.

Finally, referring to FIG. 5, the simplified structure of a processing device implementing a technique for processing a received multicarrier signal according to one particular embodiment described here above is presented.

Such a device comprises a memory 51 comprising a buffer memory, a processing unit 52 equipped for example with a microprocessor μP, and driven by the computer program 53 implementing the method for receiving according to the invention.

At initialization, the code instructions of the computer program 53 are for example loaded into a RAM and then executed by the processor of the processing unit 52. The processing unit 52 inputs a multicarrier signal. The microprocessor of the processing unit 52 implements the steps of the method for receiving described here above according to the instructions of the computer program 53 to estimate the frequency offset affecting the received multicarrier signal relative to the corresponding sender multicarrier signal. To this end, the processing device comprises, in addition to the buffer memory 51, means for estimating a frequency offset comprising means for determining the integer part of the frequency offset and means for determining the fractional part of the frequency offset, such that the means for determining the integer part of the frequency offset comprising means for measuring an offset, in the spectral domain, between the position of at least one specific carrier of the sender multicarrier signal and the position of the corresponding specific carrier or carriers in the received multicarrier signal. These means are driven by the microprocessor of the processing unit 52.

The invention also pertains to a receiver comprising a processing device of this kind. Such a receiver is especially capable of receiving an optical signal and comprises in addition to the processing device, means of coherent detection of the optical signal.

Although the present disclosure has been described with reference to one or more examples, workers skilled in the art will recognize that changes may be made in form and detail without departing from the scope of the disclosure and/or the appended claims.

The invention claimed is:

1. A method for receiving an optical signal comprising:
   an act of coherent detection of the optical signal, delivering a received multicarrier signal, and
   an act of processing the received multicarrier signal comprising an act of estimating a frequency offset affecting said received multicarrier signal relative to a corresponding sender multicarrier signal, said offset being strictly greater than an inter-carrier spacing of said sender multicarrier signal, wherein said act of estimating implements two sub-acts comprising:
      a sub-act of determining an integer part of the frequency offset, equal to a multiple of said inter-carrier spacing;
      a sub-act of determining a fractional part of the frequency offset, equal to a fraction of said inter-carrier spacing;
   and wherein said sub-act of determining the integer part of the frequency offset implements a measurement, in the spectral domain, of an offset between a position of at least one specific carrier of said sender multicarrier signal and a position of a corresponding specific carrier or carriers in said received multicarrier signal.

2. The method for receiving according to claim 1, wherein said specific carriers belong to the group consisting of:
   a pilot carrier, the position of which, in said sender multicarrier signal, is known to at least one receiver implementing said method for receiving;
   a residual carrier, the frequency of which corresponds to a sending frequency of said optical signal after combination of the in-phase and in-quadrature components of said sender multicarrier signal;
   a payload carrier comprising a first or last sub-carrier carrying payload data in said sender multicarrier signal.

3. The method for receiving according to claim 1, wherein the method comprises detecting, in said received multicarrier signal in the spectral domain, at least one power peak above a predetermined threshold, delivering the position of said specific carrier in said received multicarrier signal.

4. The method for receiving according to claim 1, wherein the method comprises detecting, in said received multicarrier signal in the spectral domain, a difference in power between two successive carriers that is above a predetermined threshold, delivering the position of said specific carrier in said received multicarrier signal.

5. The method for receiving according to claim 1, wherein said sub-act of determining the fractional part of the frequency offset makes a comparison between at least two multicarrier symbols of said received multicarrier signal corresponding to multicarrier symbols that are identical when sent.

6. The method for receiving according to claim 1, wherein the method comprises compensating for the frequency offset implementing a summing of said integer part and said fractional part, a conversion of the result of said summing from the spectral domain into the time domain, and a multiplication of said received multicarrier signal by the result of the conversion in the time domain.

7. A non-transitory computer-readable medium comprising a computer program stored thereon, which comprises instructions for implementing a method for receiving an optical signal when this program is executed by a processor, wherein the method comprises:

an act of coherent detection of the optical signal, delivering a received multicarrier signal, and an act of processing with the processor the received multicarrier signal comprising an act of estimating a frequency offset affecting said received multicarrier signal relative to a corresponding sender multicarrier signal, said offset being strictly greater than an inter-carrier spacing of said sender multicarrier signal, wherein said act of estimating implements two sub-acts comprising:

a sub-act of determining an integer part of the frequency offset, equal to a multiple of said inter-carrier spacing;

a sub-act of determining a fractional part of the frequency offset, equal to a fraction of said inter-carrier spacing;

and wherein said sub-act of determining the integer part of the frequency offset implements a measurement, in the spectral domain, of an offset between a position of at least one specific carrier of said sender multicarrier signal and a position of a corresponding specific carrier or carriers in said received multicarrier signal.

8. A device for receiving an optical signal comprising:

means for coherent detection of said optical signal, delivering a received multicarrier signal, and means for processing said received multicarrier signal comprising means for estimating a frequency offset affecting said received multicarrier signal relative to a corresponding sender multicarrier signal, said offset being strictly greater than an inter-carrier spacing of said sender multicarrier signal, wherein said means for estimating comprise:

means for determining an integer part of the frequency offset equal to a multiple of said inter-carrier spacing;

means for determining a fractional part of the frequency offset equal to a fraction of said inter-carrier spacing;

and said means for determining the integer part of the frequency offset comprise means for measuring, in the spectral domain, an offset between a position of at least one specific carrier of said sender multicarrier signal and a position of the corresponding specific carrier or carriers in said received multicarrier signal.

* * * * *

UNITED STATES PATENT AND TRADEMARK OFFICE
CERTIFICATE OF CORRECTION

PATENT NO. : 9,455,862 B2
APPLICATION NO. : 14/391969
DATED : September 27, 2016
INVENTOR(S) : Julie Karaki et al.

It is certified that error appears in the above-identified patent and that said Letters Patent is hereby corrected as shown below:

In Column 12:
In Claim 1, Line 31, insert --,-- after the word "signal"

Signed and Sealed this
Fifteenth Day of May, 2018

Andrei Iancu
*Director of the United States Patent and Trademark Office*